Jan. 6, 1931.                E. W. CLARKE                1,787,971
             MEANS OF MAKING JOINTS IN SEWER OR DRAIN PIPES
                         Filed Aug. 13, 1928

Inventor.
Ernest W. Clarke

Patented Jan. 6, 1931

1,787,971

UNITED STATES PATENT OFFICE

ERNEST W. CLARKE, OF PLEASANTVILLE, NEW YORK

MEANS OF MAKING JOINTS IN SEWER OR DRAIN PIPES

Application filed August 13, 1928. Serial No. 299,195.

The invention relates to the making or forming of joints between the individual pipes used in laying or constructing pipe lines for the conveyance of liquids, especially sewage or drainage water, although it may be used in other ways if found suitable or desirable.

Figures 1, 2, 3:
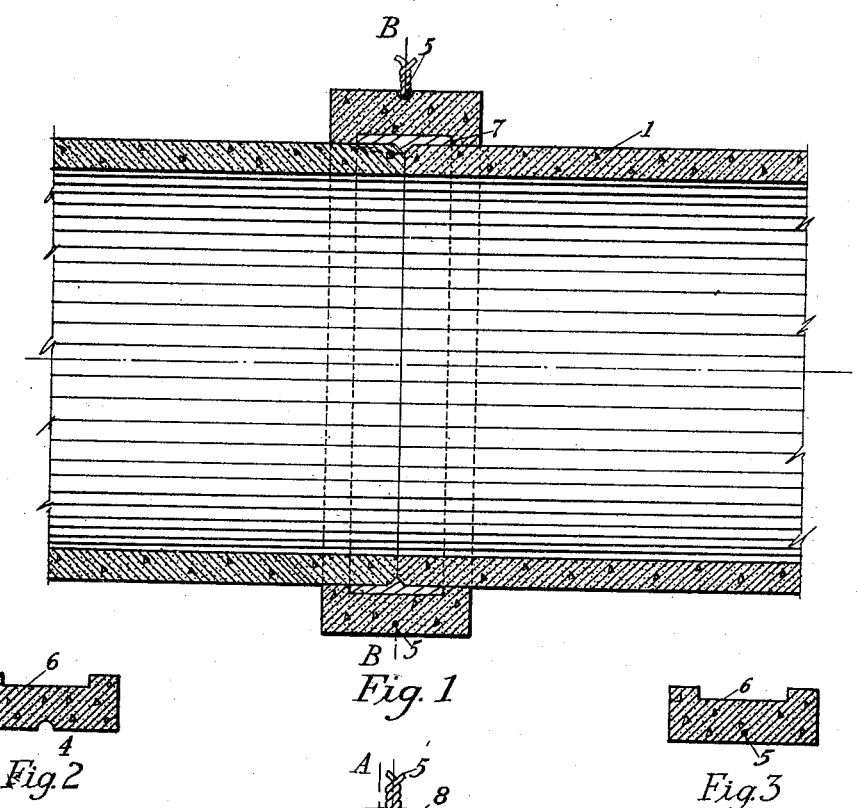
Figure 4:
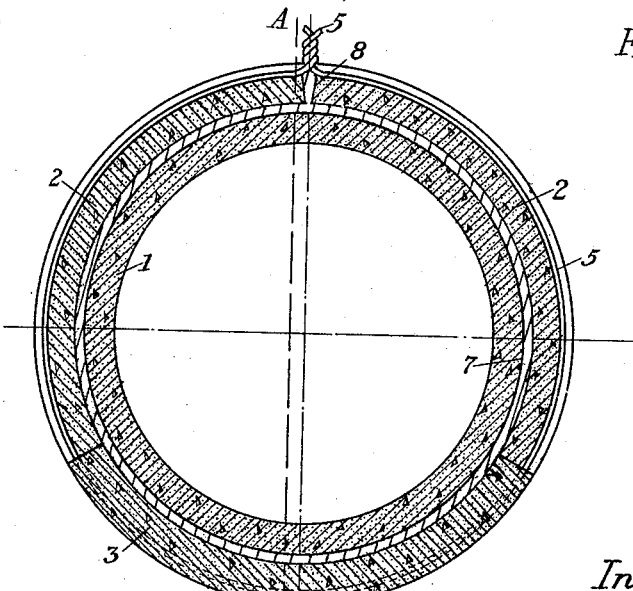

One form of the invention is illustrated in the accompanying drawing, in which Figure 1 is a longitudinal vertical section shown as line A—A on Figure 4 of abutting ends of pipes with my invention applied; Figure 2 and Figure 3 are cross sections of the upper and lower band sections respectively and Figure 4 is a vertical cross section shown as line B—B on Figure 1 along the line of the abutting ends of the pipes.

The joint consists of a band, preferably of the same material of the pipe 1, divided radially into two or more pieces, here shown divided into three pieces two of 2 and one of 3. The band is circular in plan and the inside diameter is the same as the outside diameter of the pipe with which it is used. The outside diameter is such as to afford sufficient thickness to the band to provide required strength. The inside face of the band is cast with a groove or recess 6. A wire or other, preferably metal, cinch is cast in the lower section of the band as in 3, designed to be placed at the bottom or invert of the sewer for example. This wire is of sufficient length to entirely encircle the band, when in place, and leave a length to twist or otherwise fasten the ends together. The upper section or sections of the band are cast with a groove 4 in their outer face in which the wire 5 is to lay. The pipes to be used with the band as described, are preferably cast with spigot ends, the ends being preferably beveled on the outer edge.

The method of using and laying this joint is as follows:

The trench is prepared in the usual way and two invert sections of the band are then laid at the proper grade in the trench, and at such a distance apart as to fit the pipe length, the pipe ends being centered on each band, leaving half a band exposed at each end. A third invert band or section is then put in place at the proper distance and a second pipe laid with one end butting against one end of the first pipe and resting on the exposed portion of the band.

The middle band as described, is then finished by placing the remaining upper section or sections in position and drawing the wire cinch 5 up into the groove 6 and twisting or otherwise fastening the ends of the wire 5 together. The circumferential length of the band is designed to be such that a space of proper width 8 will be left between the ends of the band sections at the top of the pipe. Jointing material, 7, which may be any suitable fluid or semi-fluid material such as a bituminous pipe jointing compound or cement grout is then poured into the space 8, filling the groove 6. On pipe of small diameter the grooves in the invert sections of the band may be filled with cement mortar before placing the pipe in position, and the grooves in the upper sections filled with cement mortar before placing them around the pipe.

The operation is completed by filling the groove 4 on the outside of the pipe with mortar, covering and protecting the wire or cinch 5.

Successive pipes are laid by the placing of another invert band section in proper position to receive the end of the pipe and completing the band at the end of the previously laid adjacent pipe section.

The pipes and bands may be made of clay, plain, or reinforced concrete or other suitable material, depending on their diameter and the stresses to which they may be subjected.

I claim:

1. A new and useful means of making joints in sewer or drain pipes comprising a sectional band adapted to cover the adjacent ends of the pipes, a wire or cinch cast in the invert section of the band and encircling the upper section thereof adapted to hold the band sections in place, said band sections being provided with grooves or recesses and used with jointing material adapted to fill said grooves or recesses and means for protecting the exposed portion of the wire or cinch.

2. A new and useful means of making joints in sewer or drain pipes comprising a sectional band adapted to cover the adjacent ends of the pipes, a wire or cinch cast in the invert section of the band adapted to hold the band sections in place, said band sections being provided with grooves or recesses and used with jointing material adapted to fill said grooves or recesses, a groove on the outer sides of the band sections to receive the free ends of the wire or cinch and means for protecting the free ends of the wire or cinch in said last named grooves.

In testimony whereof I have signed this specification.

ERNEST W. CLARKE.